US007846586B2

(12) United States Patent
Maeda et al.

(10) Patent No.: US 7,846,586 B2
(45) Date of Patent: Dec. 7, 2010

(54) ACTIVE MATERIAL FOR POSITIVE ELECTRODE OF LITHIUM SECONDARY BATTERY

(75) Inventors: Toshiki Maeda, Niihama (JP); Hirofumi Iisaka, Toyota (JP); Satoru Suzuki, Kariya (JP); Manabu Yamada, Kariya (JP)

(73) Assignees: Sumitomo Metal Mining Co., Ltd., Tokyo (JP); Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 141 days.

(21) Appl. No.: 10/715,525

(22) Filed: Nov. 19, 2003

(65) Prior Publication Data

US 2004/0161668 A1 Aug. 19, 2004

(30) Foreign Application Priority Data

Nov. 20, 2002 (JP) ............................ 2002-337101

(51) Int. Cl.
*H01M 4/52* (2010.01)

(52) U.S. Cl. ................. 429/231.3; 429/223; 429/231.5; 429/231.6; 429/229

(58) Field of Classification Search ................. 429/231, 429/231.3, 223, 231.5, 231.6, 229
See application file for complete search history.

(56) References Cited

U.S. PATENT DOCUMENTS 5,911,920 A 6/1999 Hasezaki et al.

FOREIGN PATENT DOCUMENTS

| | | |
|---|---|---|
| EP | 0 944 125 A1 | 9/1999 |
| JP | 08-007894 | 1/1996 |
| JP | 08-078006 | 3/1996 |
| JP | 09-245787 | 9/1997 |
| JP | 11-185755 | 7/1999 |
| JP | 11-224664 | 8/1999 |
| JP | 11-273677 | 10/1999 |
| JP | 2000-021402 | 1/2000 |
| JP | 2000-030693 | 1/2000 |
| JP | 2002-015739 | 1/2002 |
| JP | 2002-015740 | 1/2002 |
| JP | 2002-124261 | 4/2002 |
| JP | 2002-313420 | 10/2002 |
| WO | WO 03/049216 A1 | 6/2003 |

*Primary Examiner*—Jane Rhee
(74) *Attorney, Agent, or Firm*—Finnegan, Henderson, Farabow, Garrett & Dunner, LLP

(57) ABSTRACT

A lithium-nickel complex oxide material for active material for positive electrode of a lithium secondary battery is provided and expressed by the general formula $Li_x(Ni_{1-y}Co_y)_{1-z}M_zO_2$ (where, $0.98 \leqq x \leqq 1.10$, $0.05 \leqq y \leqq 0.4$, $0.01 \leqq z \leqq 0.2$, M=at least one element selected from the group of Al, Zn, Ti and Mg), wherein according to Rietveld analysis, the Li site occupancy rate for the Li site in the crystal is 98% or greater, and the average particle size of the spherical secondary particles is 5 μm to 15 μm, and wherein the difference in specific surface area between before and after the washing process is 1.0 $m^2/g$ or less.

2 Claims, 2 Drawing Sheets

ACTIVE MATERIAL FOR POSITIVE ELECTRODE OF LITHIUM SECONDARY BATTERY

BACKGROUND OF THE INVENTION

This invention relates to a lithium secondary battery in which a lithium-nickel composite oxide is used as the active material for positive electrode and more particularly to an active material for positive electrode of a lithium secondary battery that makes it possible to improve the initial capacity of the battery.

Lithium secondary batteries are compact and have a high capacity, so they have rapidly penetrated society by being used in mobile telephones, video cameras, PDAs (Personal Digital Assistants) and the like. Furthermore, recently, much research and development is being advanced with the aim of using them in automobiles such as a hybrid vehicle. Meantime, currently there is a high demand from society for batteries having high capacity, and that are safe and have excellent output characteristics.

Lithium-nickel composite oxide (hereafter referred to as LNO), which is one kind of positive electrode material used for lithium secondary batteries, has higher capacity than the lithium-cobalt oxide in current mainstream, and has advantages in that the material Ni is inexpensive than Co and it is easier to obtain, so it is expected to become the next-generation positive electrode material, and research and development is continuing for it. In a lithium secondary battery, when charging the battery, lithium dissolves into the electrolyte from the active material of the positive electrode, then passes through the separator and enters in a layer of the negative electrode, such as in the graphite layer that is capable of holding lithium. When discharging the battery, the reverse reaction occurs, and the lithium leaves the negative electrode and passes through the separator, then enters the lithium site in the lithium layer of the active material for positive electrode. Therefore, when charging and discharging a lithium secondary battery, the lithium becomes lithium ions that move back and forth between the positive and negative electrodes in this way.

When using this kind of secondary battery that uses LNO in an automobile, having high capacity is one of its important requirements for characteristics. In looking at conventional measures, for example as disclosed in Japanese Patent Publication No. Tokukai Hei 06(1994)-060887, in the case of a positive electrode having a main material of $Li_xNiO_y$ (where $0<x\leqq 1.3$, $1.8<y<2.2$), a positive electrode material for which the X-ray diffraction intensity ratio of a specified lattice plane of the positive electrode material is regulated, and whose specific surface area according to the BET method is in the range from 0.5 $m^2/g$ to 10 $m^2/g$, has a large discharge capacity. On the other hand, as disclosed in Japanese Patent Publication No. Tokukai Hei 10(1998)-162830, when it is premised that the sulfur content is 0.5 weight % or less in $LiNiO_2$ powder or $LiNi_{1-x}M_xO_2$ powder (where $0<x\leqq 0.4$, M=at least one member selected from the group of Co, Mn, B, Al, V, P. Mg and Ti), it is preferable from the aspect of preservability that the specific surface area is 0.01 to 0.5 $m^2/g$. In the above disclosures, however, information regarding the specific surface area of LNO for improving the initial capacity is undetermined.

Moreover, as disclosed in Japanese Patent Publication No. Tokukai 2000-30693, in order to obtain a high initial capacity, the LNO must have a higher Li site occupancy rate (97% or more). The term "Li site occupancy rate" indicates the percentage of Li ions occupying the Li site in the Li layer in the LNO crystal.

However, when the Li site occupancy rate becomes 98% or greater, it is difficult to obtain correlation with the initial capacity, so in order to develop a lithium secondary battery with even higher capacity, a new index having a correlation with the initial capacity is necessary other than the Li site occupancy rate.

In the case of the LNO described in Japanese Patent Publication No. Tokukai 2000-30693, the average particle size of the primary particles is regulated, however the average particle size of the secondary particles is not regulated.

SUMMARY OF THE INVENTION

An object of the present invention is to provide an active material for positive electrode of the lithium secondary battery which is expressed by the general formula $Li_x(Ni_{1-y}Co_y)_{1-x}M_xO_2$ (where $0.98\leqq x\leqq 1.10$, $0.05\leqq y\leqq 0.4$, $0.01\leqq z\leqq 0.2$, M=at least one element selected from the group of Al, Zn, Ti and Mg), wherein according to Rietveld analysis, the Li site occupancy rate for the Li site in the crystal is 98% or greater, and the average particle size of the spherical secondary particles is 5 μm to 15 μm, and wherein the difference in specific surface area between before and after the washing process is 1.0 $m^2/g$ or less.

DETAILED DESCRIPTION OF THE PREFERRED EMBODIMENTS

Figure 1:
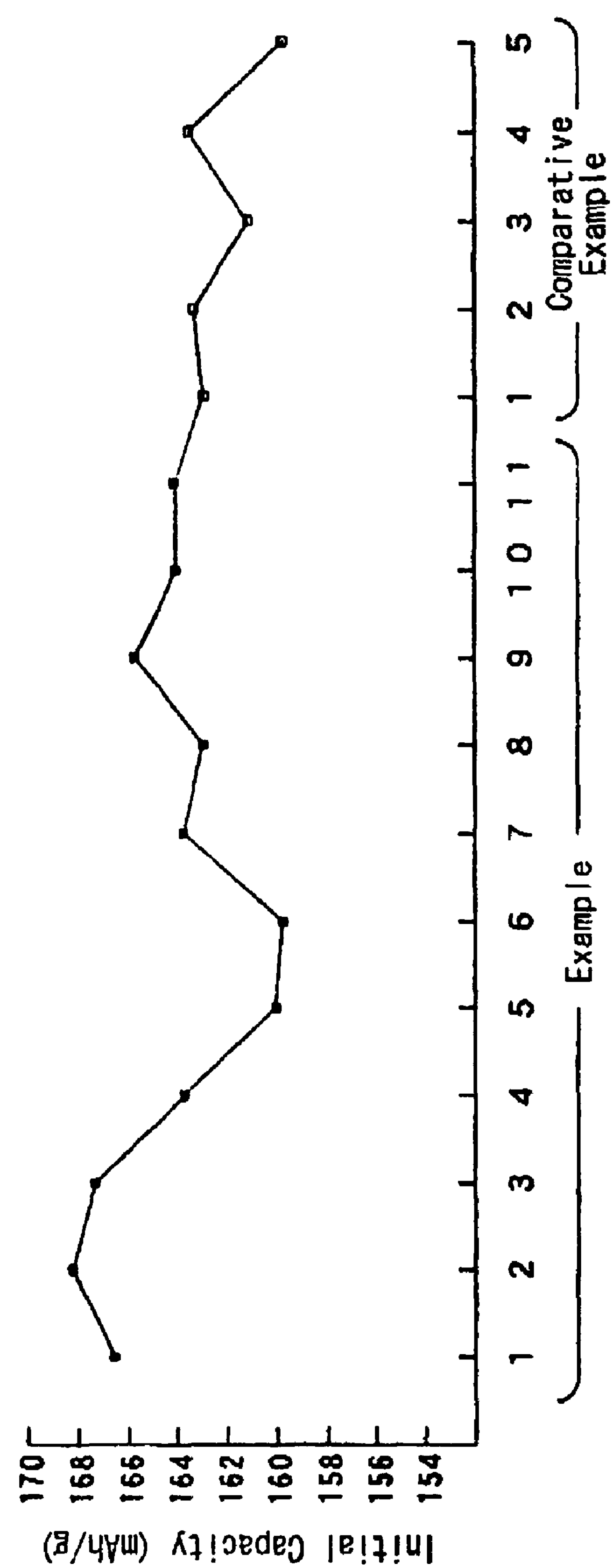
FIG. 1 is a graph of initial discharge capacity of examples in the present inventions and comparative examples obtained by charging and discharging measurement of a lithium secondary battery.

The invention will be described in detail below.

The active material for positive electrode of the lithium secondary battery of this invention is an LNO (lithium-nickel composite oxide) which is expressed by the general formula $Li_x(Ni_{1-y}Co_y)_{1-z}M_zO_2$ (where, $0.98\leqq x\leqq 1.10$, $0.05\leqq y\leqq 0.4$, $0.01\leqq z\leqq 0.2$, M=at least one element selected from the group of Al, Zn, Ti and Mg), and according to Rietveld analysis, the Li site occupancy rate for the Li site in the crystal is 98% or greater, and the average particle size of the spherical secondary particles is 5 μm to 15 μn.

In the present invention, the LNO particles are subjected to a washing process for use in the active material for positive electrode. The specific surface area of the spherical secondary particles of LNO becomes stable after the washing process. It is preferred that the difference between the specific surface area after the washing process and the specific surface area before the washing process be 1.0 $m^2/g$ or less.

The lithium secondary battery of this invention uses the active material described above for the positive electrode.

Each of the elements of the active material for positive electrode of the lithium secondly battery of the present invention will be explained below.

Co

The Co in the LNO contributes to the improvement of the cyclic characteristics, however when the value of 'y' is less than 0.05, it is not possible to obtain sufficient cyclic characteristics, and the rate for maintaining the capacity drops. Moreover, when the value of 'y' is greater than 0.4, the drop in initial discharge capacity becomes large. Also, as the amount of expensive Co increases, it becomes impractical to use from the aspect of cost.

M

'M', additive element, is at least one element selected from the group of Al, Zn, Ti and Mn; and when it is uniformly distributed in the lithium-nickel composite oxide crystal, the crystal structure of the lithium-nickel composite oxide material becomes stable. This makes it possible to increase the thermal stability of the lithium secondary battery. When the amount of the additive element, indicated by 'z', is less than 0.01, stability of the crystal structure is not seen, and, when 'z' becomes greater than 0.2, the stability of the crystal structure becomes more improved, however, the drop in the initial discharge capacity becomes large, and is not preferred.

Factors Related to the Initial Discharge Capacity Other than the Additive Elements The inventors found that in the case of the LNO described above, the LNO having the Li site occupancy rate as well as the shape and size of the secondary particles regulated, and having a small difference in specific surface area between before and after the washing process is desirable for use as the active material for positive electrode, leading to an increase in initial discharge capacity of the battery. When the active material for positive electrode has the aforementioned characteristics, it is possible to obtain a lithium secondary battery having high initial capacity.

Li Site Occupancy Rate

The term "Li site occupancy rate" indicates the percentage of Li ions occupying the Li site in the Li layer in the LNO crystal having layered rock-salt structure, or in other words, in the $LiNiO_2$.

When the Li site occupancy rate of the active material LNO is low, there is substantially few Li in the Li site, and Ni, Co or M (M=Al, Zn, Ti and/or Mg) exists in the Li site; and in most cases, Li leaves the crystal structure, and there is a high possibility that it will exist in the form of lithium carbonate, etc. Therefore, the LNO crystal structure becomes imperfect and thus it is not possible to obtain an active material for positive electrode of the lithium secondary battery having sufficient capacity and good cyclic characteristics.

The Li site occupancy rate is calculated using Rietveld analysis. Here, Rietveld analysis is a method in which a crystal structure model is presumed, and where all of the parameters of the crystal structure (lattice constant, Li site occupancy rate, etc.) are adjusted precisely such that the X-ray diffraction pattern obtained from that crystal structure model matches an actually measured X-ray diffraction pattern. The Rietveld analysis is detailed e.g. in the reference: F. Izumi, "The Rietveld Method," (ed. by R. A. Yong, Oxford University Press), Oxford (1993), Chap. 13, and H. Arai et al, Solid State Ionics, 80 (1995) p 261, which is incorporated in this specification by reference.

In order to obtain a secondary battery having a higher initial capacity, the LNO must have a higher Li site occupancy rate. As mentioned above, up to a Li site occupancy rate of about 98%, there is good correlation between the Li site occupancy rate and the initial capacity, and the initial capacity becomes higher the higher the Li site occupancy rate is. However, when the Li site occupancy rate becomes greater than 98%, there is not good correlation with initial capacity, so it is necessary to look at the relationship with other parameters for battery characteristics. Therefore, in order to obtain a battery having a large initial capacity, in addition to having a Li site occupancy rate of 98% or more, it is necessary to obtain an LNO characterized by another parameters that are correlated with the initial capacity.

Average Particle Size of Secondary Particles

When the average particle size of LNO secondary particles is less than 5 μm, the specific surface area of an active material increases, and when used in a battery, there is a possibility that the reaction during charging and discharging will occur rapidly, which is dangerous. Also, the tap density of the LNO decreases, so that the discharge capacity per unit weight is dropped. On the other hand, when the average particle size is greater than 15 μm, the particles are too large, so that the electrolyte is unable to sink into the interior of the particles, or the diffusion of Li in the interior of the particles cannot be promoted, and so the utilization factor drops, and when manufacturing the electrodes, the particles break up easily, so the battery density does not rise.

Measurement of the average particle size was performed using a laser-type particle size distribution measurement apparatus (Micro-trac particle size distribution measurement apparatus).

LNO Washing Process

The inventors investigated the characteristics of a LNO powder that made it possible to obtain a lithium secondary battery that had even higher initial capacity, and as a result found that washing the LNO powder with water is effective for use in the active material for positive electrode, and that a lithium secondary battery that used the washed LNO powder had a higher initial capacity in the case where the difference between the specific surface area after the washing process and the specific surface area before the washing process is 1.0 $m^2/g$ or less.

The washing process is a process in which the produced LNO powder is mixed with water, and then after a specified amount of time, it is filtered, and the deposit obtained is dried. When washing the LNO powder in this way, the $Li_2$ $CO_3$, LiOH or $Li_2SO_4$ impurities that adhere to the surface of the secondary particles of the LNO powder are removed and the primary particles formed the secondary particles appear on the surface, and since the size of those particles is small, the specific surface area of the LNO powder after the washing process increases. Also, in the case of LNO secondary particles that primary particles adheres weakly mutually, the secondary particles are broken up by the washing process and the primary particles become separated from the secondary particles. According to these effects, it is thought that the LNO powder after the washing process shows the characteristic which manufactured powder originally had.

When the washing process is insufficient, the $Li_3$ $CO_5$, LiOH or $Li_2SO_4$ impurities are not completely removed, and the specific surface area after the washing process does not becomes stable. So, by performing the washing process until the change in the specific surface area becomes small and stable, and taking it to be the end point at which the washing process is complete, it is possible to perform the washing process sufficiently, measuring that amount of time taken for the washing process.

The active material for positive electrode of the lithium secondary battery of this invention is a LNO powder or which the washing process is performed and where the difference in specific surface area between before and after the washing process is 1.0 $m^2/g$ or less; and when that LNO is used as the active material for positive electrode, a lithium secondary battery having a high initial capacity is obtained. When the difference in specific surface area between before and after the washing process of the LNO powder is greater than 1.0 $m^2/g$, the size of the primary particles forming the secondary particles is too small, and so it is presumed that the crystallinity of the particle surface decreases, and that there will be a decrease in the discharge characteristics. Also, in the case where the secondary particles are broken up due to the washing process and the primary particles separate easily, the difference in specific surface area between before and after the washing process is greater than 1.0 $m^2/g$, and it is thought that for this kind of LNO powder, since primary particles adheres weakly mutually form secondary particles, it becomes difficult for lithium element to move among the LNO primary particles, so that there will also be a decrease in the battery characteristics.

The preferred examples of the invention will be explained below with reference to the table and figures, however, the scope of the invention is not limited to these examples.

Examples 1 to 11, and Comparative Examples 1 to 5

Nickel sulfate crystals are mixed with cobalt sulfate crystals such that the Ni/Co mole ratio is 0.83/0.17, and then the mixture is dissolved in water to obtain an aqueous solution, to which an ammonia aqueous solution is added a drop at a time and a reaction was carried out at pH of from 11 to 13 and a temperature of from 40° C. to 50° C., to obtain the spherical secondary particles (average particle size of from 5 μm to 15 μm) of examples 1 to 11 and comparative examples 1 to 3, expressed as $Ni_{0.88}Co_{0.17}(OH)_2$. Also, by controlling the concentration of the nickel during crystallization, the spherical secondary particles (average particle size of 4.8 μm and 16 μm) of comparative examples 4 and 5, expressed as $Ni_{0.88}Co_{0.17}(OH)_2$, were obtained.

The obtained secondary particles were put in water for stirring, and $NaAlO_2$ was added until the mole ratio became Al/(Ni+Co+Al)=0.03, after which, sulfuric acid was used to neutralize the solution to pH=9.5. The structure of the obtained spherical secondary particles was $(Ni_{0.85}Co_{0.17})_{0.97}Al_{0.05}(OH)_2$.

Moreover, the spherical secondary particles (examples 1 to 11, comparative examples 1 to 5) were mixed with lithium hydroxide such that the mole ratio became Li/(Ni+Co+Al)=1.04, then they were placed in a high-speed mixer and mixed with water as a binder at a ratio of 8.4 weight %. Of the obtained granulated substance, examples 1 to 11 and comparative examples 4 and 5 were sintered in an furnace adjusted to an oxygen atmosphere at a sintering temperature of 750° C. Comparative examples 1 to 3 were sintered at a sintering temperature of 690° C. The obtained sintered products were then crushed in a pin mill crushing machine. The obtained sintered products are useful for the active materials for positive electrode wherein composition was $Li_{1.04}(Ni_{0.89}Co_{0.17})_{0.97}Al_{0.09}O_2$, and the average particle sizes were as shown in Table 1.

X-ray diffraction measurement was performed for the obtained active materials (examples 1 to 11, comparative examples 1 to 5), and the Li site occupancy rates for each were determined using the Rietveld method.

X-ray diffraction measurement was performed using an X-ray diffraction apparatus that uses Cu—K α rays (Rigaku Ltd., Model RAD-γVB). Rietveld analysis was performed using the analysis software 'RIETAN94' (freeware).

The Li site occupancy rates obtained by Rietveld analysis are shown in Table 1.

TABLE 1

| | Li Site Occupancy Rate (%) | Average Particle Size (μm) | Specific Surface Area ($m^2/g$) Before Washing | After Washing | Difference | Initial Capacity (mAh/g) |
|---|---|---|---|---|---|---|
| ex-1 | 98.58 | 9.4 | 0.57 | 1.42 | 0.85 | 166.5 |
| ex-2 | 98.20 | 8.8 | 0.53 | 1.45 | 0.92 | 168.2 |
| ex-3 | 99.05 | 12.2 | 0.59 | 1.53 | 0.94 | 167.3 |
| ex-4 | 98.25 | 10.0 | 0.65 | 2.04 | 1.39 | 163.7 |
| ex-5 | 98.28 | 8.2 | 0.52 | 1.91 | 1.39 | 160.0 |
| ex-6 | 98.45 | 10.0 | 0.62 | 1.94 | 1.32 | 159.7 |
| ex-7 | 98.46 | 9.0 | 0.70 | 1.91 | 1.21 | 163.7 |
| ex-8 | 98.41 | 9.0 | 0.67 | 1.99 | 1.32 | 162.9 |
| ex-9 | 98.77 | 9.8 | 0.72 | 1.79 | 1.07 | 165.7 |
| ex-10 | 98.33 | 5.0 | 0.87 | 1.89 | 1.02 | 164.0 |
| ex-11 | 98.45 | 15.0 | 0.53 | 1.52 | 0.99 | 164.1 |
| com-1 | 97.82 | 8.7 | 0.62 | 1.71 | 1.09 | 162.9 |
| com-2 | 97.68 | 8.3 | 0.68 | 2.01 | 1.33 | 163.3 |
| com-3 | 97.86 | 10.1 | 0.60 | 1.87 | 1.27 | 161.1 |
| com-4 | 98.25 | 4.8 | 0.88 | 2.11 | 1.23 | 163.5 |
| com-5 | 98.28 | 16.0 | 0.49 | 1.70 | 1.21 | 159.7 |

ex: example;
com: comparative example

Furthermore, the specific surface area of the active material of example 1 was measured using a specific surface area measurement apparatus (Yuasa Ionics, Ltd., mode Quantasorb QS-10) that uses a Nitrogen adsorption method. Next, 20 g of the active material was placed in a beaker with 500 g of water and stirred with the stirrer. The temperature was 25° C. After one minute, the slurry was filtered and the obtained deposit was dried at 150° C. for 24 hours in a vacuum drier. The specific surface area of the active material after the washing process was measured and subtracted from the specific surface area before the washing process to find the difference.

The active materials for positive electrode of examples 2 to 11 and comparative examples 1 to 5 were measured in the same way as example 1.

The differences between the specific surface areas of the active materials after the washing process and the specific surface areas before the washing process are shown in Table 1. In examples 1 to 3, the differences in specific surface area between before and after the washing process were less than 1.0 $m^2/g$.

Furthermore, spirally wound type lithium secondary batteries were made using each of the active materials for positive electrode.

First, the active materials for positive electrode at 25° C. were mixed with carbon black as a conductive material, and polyvinylidene fluoride (PVDF) as a binder at weight ratio of 85:10:5, and then dissolved in N-methyl-2-pyrrolidone (NMP) to form a cathode active material paste. The obtained active material paste was then applied to both sides of an aluminum foil using a comma coater, and heated to 100° C. and let to dry to form a positive electrode. A load was applied to the positive electrode using a roll press and the positive electrode was formed into a sheet having improved electrode density.

Next, an active material for negative electrode made of graphite mixed with the binder PVDF at a weight ratio of 92.5:7.5 was dissolved in an NMP solution, and an active material paste for negative electrode was obtained. The obtained active material paste was applied to both sides of a copper foil using a comma coater as was done for the positive electrode, and dried at 120° C. to obtain the negative electrode. A load was applied to the negative electrode using a roll press and the negative electrode was formed into a sheet having improved electrode density.

The obtained positive electrode sheet and negative electrode sheet were separated by a separator made of a 25 μm thick fine porous polyethylene sheet and wound to form a wound-type electrode. In the state where the positive and negative electrode have their lead tab bonded to their respective terminals, respectively, the wound-type electrode was then placed inside the battery case.

Lithium salt, $LiPF_6$, was dissolved in an organic solvent made by mixing ethylene carbonate (EC) with diethylene carbonate (DEC) having a volume ratio of 3:7 to adjust the lithium salt to 1 mol/$dm^9$ in the electrolyte.

The obtained electrolyte was poured into the battery case where the wound-type electrodes had been inserted, and then the opening section of the battery case were covered and the battery case was sealed.

Lithium secondary batteries using the active materials for positive electrode of examples 1 to 11 and comparative examples 1 to 5 were made as described above.

Measurement of the charging and discharging of the lithium secondary batteries using each of the active materials was performed. In the measurement of charging and discharging, the batteries that were made were let to sit for about 24 hours, and after the OCV became stable, the initial capacity was measured for the positive electrode, adjusting a current density to 0.5 mA/$cm^2$ and cutoff voltage from 4.1 V to 3.0 V.

Figure 2:
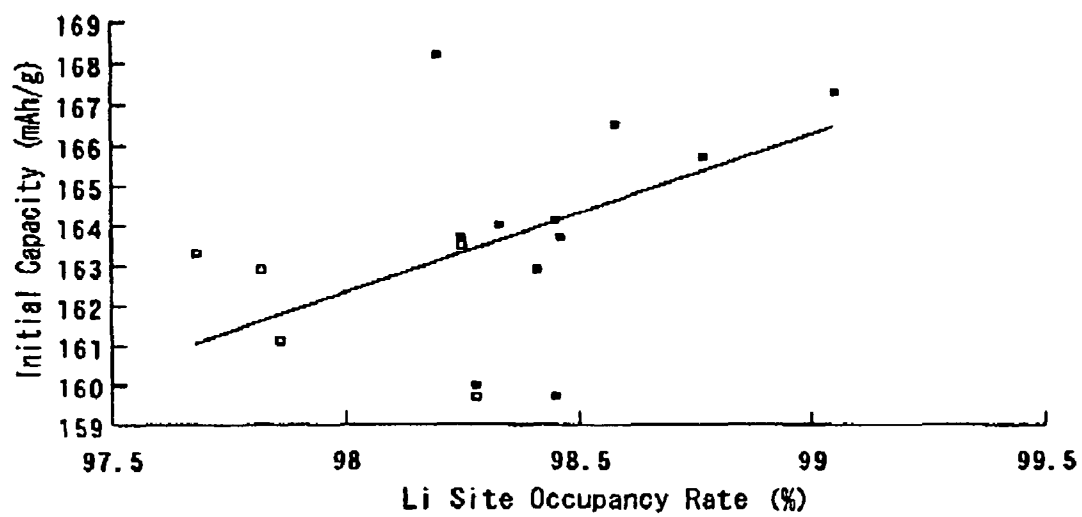
FIG. 2 is a graph to show a relation between the initial discharge capacity and the Li site occupancy rate of a lithium secondary battery.
Figure 3:
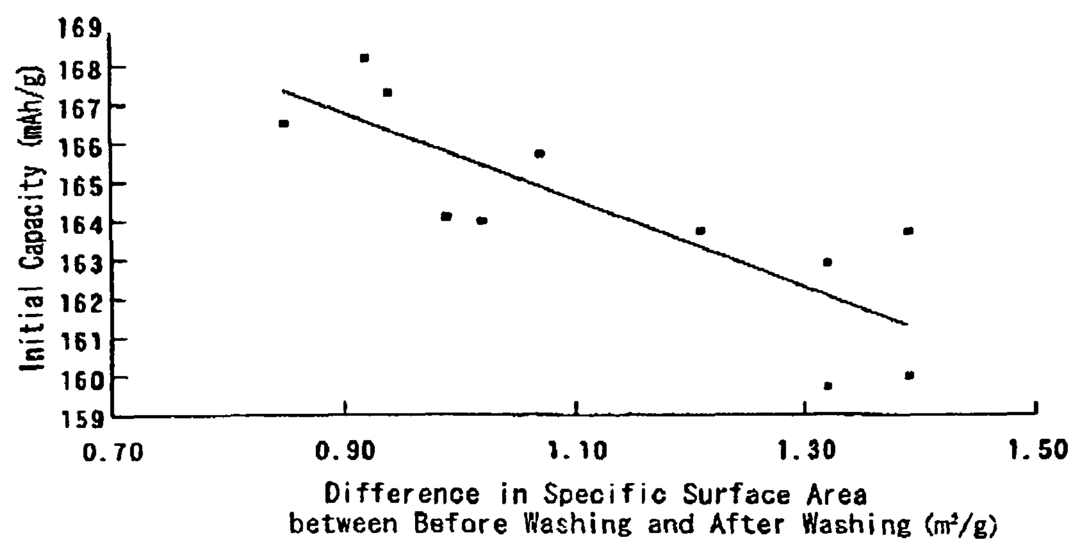
FIG. 3 is a graph to show a relation between the initial discharge capacity and the difference in specific surface area between before and after washing.

The measurement results are shown in FIG. 1. The relationship between the Li site occupancy rate and the initial capacity is shown in FIG. 2. The relationship between the difference in specific surface area between before and after the washing process and the initial capacity is shown in FIG. 3.

The active materials for positive electrode of examples 1 to 11 of the invention are spherical secondary particles having an average particle size of 5 μm to 15 μm, and as shown in Table 1, according to Rietveld analysis, the Li site occupancy rate of Li sites in the crystal was greater than 98.0%. As shown by ■ in FIG. 2, it was found that the initial capacities of the obtained lithium secondary batteries were relatively high.

Also, in examples 1 to 3 of the invention, the differences in specific surface area between before and after the washing process were less than 1.0 $m^2$/g, and it was found that they had higher initial capacities than the other examples.

Furthermore, in comparative example 4, the specific surface area before washing was too large, so the reaction during the charging and discharging occurred rapidly. In comparative example 5, the specific surface area before washing was too small so the utilization factor was very low.

Comparative Example 6

In comparative example 6, the sintered product was obtained in substantially the same way as in example 1 except that the formula was adjusted to be $Li_{1.09}(Ni_{0.89}Co_{0.17})O_2$. The obtained sintered product was useful for the active material for positive electrode, and had an average particle size of 10 μm.

X-ray diffraction and Rietveld analysis were performed on the obtained active material for positive electrode.

Also, in order to evaluate the stability of the crystal structure, differential scanning calorimetry was performed to find the exothermic peak temperature. Measurement was performed on a sample for which LNO was charged to Li=0.3, and then washed with DEC and allowed to dry in a vacuum, after which the electrolyte was added.

Also, the charging and discharging of the lithium secondary battery was measured in the same way as for example 1, and the ratio of the initial discharge capacity and the discharge capacity after 50 cycles was taken and evaluated as the cycle maintenance rate.

These results are shown in Table 2. In the case of comparative example 6, Al is not added to the composition, so the initial discharge capacity is high. However, the exothermic peak temperature was 223° C., which was low compared to 235° C. for the cathode active material $Li_{1.04}(Ni_{0.83}Co_{0.17})_{0.97}Al_{0.05}O_2$ of example 1 to which Al was added, and it was found that the thermal stability of the comparative example 6 was poor.

Comparative Example 7

In comparative example 7, the sintered product was obtained in substantially the same way as in example 1 except that the formula was adjusted to be $Li_{1.08}(Ni_{0.83}Co_{0.17})_{0.75}Al_{0.25}O_2$. The obtained sintered product was useful for the active material for positive electrode, and had an average particle size of 10 μm.

Evaluation of the obtained active material for positive electrode was performed in the same way as for comparative example 6. The results are shown in Table 2.

In comparative example 7, a large amount of Al was added to the composition, and the exothermic peak temperature shifted to the high-temperature side, and the effect of adding Al appeared. However, the decrease in the initial discharge capacity was remarkable in the comparative example 7.

TABLE 2

| | Li Site Occupancy Rate (%) | Difference in Specific Surface Area Between Before Washing and After Washing ($m^2$/g) | Initial Discharge Capacity (mAh/g) | Exothermic Peak Temperature (° C.) | Cycle Maintenance Rate (%) After 50 cycles |
|---|---|---|---|---|---|
| com-6 | 98.76 | 1.05 | 190 | 223 | 90.5 |
| com-7 | 98.14 | 1.40 | 95 | 253 | 95.5 |

com: comparative example

This invention is capable of providing a lithium secondary battery having a high initial capacity.

What is claimed is:

1. An active material for a positive electrode of a lithium secondary battery, comprising a lithium-nickel composite oxide of the general formula $Li_x(Ni_{1-y}Co_y)_{1-z}M_zO_2$, where:

$0.98 \leqq x \leqq 1.10$;

$0.05 \leqq y \leqq 0.4$;

$0.01 \leqq z \leqq 0.2$; and

M is chosen from at least one element among Al, Zn, Ti, and Mg, wherein:

a. according to Rietveld analysis, the Li site occupancy rate for Li sites in a crystal of the lithium-nickel composite oxide is 98% or greater;

b. the average particle size of spherical secondary particles of lithium-nickel composite oxide ranges from 5 μm to 15 μm; and c. the difference between the specific surface area of the active material before and after a washing process, the washing process being performed for assessing characteristics of the secondary particles as an index, is 1.07 $m^2/g$ or less.

2. A lithium secondary battery comprising the active material of claim 1 for a positive electrode.

* * * * *